United States Patent [19]

Döbereiner et al.

[11] Patent Number: 4,814,989

[45] Date of Patent: Mar. 21, 1989

[54] NAVIGATION METHOD FOR VEHICLES

[75] Inventors: Klaus Döbereiner, Kirchenlamitz; Ulrich Kanzler, Stein; Hans Rauch, Fürth, all of Fed. Rep. of Germany

[73] Assignee: Robert Bosch GmbH, Stuttgart, Fed. Rep. of Germany

[21] Appl. No.: 19,313

[22] PCT Filed: Apr. 9, 1986

[86] PCT No.: PCT/DE86/00153

§ 371 Date: Mar. 2, 1987

§ 102(e) Date: Mar. 2, 1987

[87] PCT Pub. No.: WO86/07142

PCT Pub. Date: Dec. 4, 1986

[30] Foreign Application Priority Data

May 30, 1985 [DE] Fed. Rep. of Germany ....... 3519277

[51] Int. Cl.⁴ ............................................. G06F 15/50
[52] U.S. Cl. .................... 364/444; 364/449; 364/571.04; 73/178 R; 340/988
[58] Field of Search ............... 369/424, 426; 364/443, 364/444, 449, 561, 571; 340/988, 989, 990, 991, 992, 993, 994, 995, 996; 73/178 R

[56] References Cited

U.S. PATENT DOCUMENTS

| | | | |
|---|---|---|---|
| 4,216,530 | 8/1980 | Yamaki et al. | 364/444 X |
| 4,371,935 | 2/1983 | Yamaki | 364/424 |
| 4,371,940 | 2/1983 | Yamcki et al. | 364/444 |
| 4,511,973 | 4/1985 | Miura et al. | 364/424 X |
| 4,514,810 | 4/1985 | Ito et al. | 364/424 |
| 4,543,572 | 9/1985 | Tancka et al. | 364/449 X |
| 4,642,776 | 2/1987 | Watsumoto et al. | 364/444 X |
| 4,663,719 | 5/1987 | Watsumoto et al. | 364/444 |
| 4,679,147 | 7/1987 | Tuiji et al. | 364/449 |
| 4,688,176 | 8/1987 | Hirata | 364/571 X |
| 4,734,863 | 3/1988 | Honey et al. | 364/571 X |

FOREIGN PATENT DOCUMENTS 3319207 11/1984 Fed. Rep. of Germany .

Primary Examiner—Gary Chin
Attorney, Agent, or Firm—Walter Ottesen

[57] ABSTRACT

A navigation method for motor vehicles having a display device (10) for representing trip destinations is proposed, in which prior to the beginning of a trip the destination data are input into a memory (12) and during the trip, by means of a composite navigation system (11–14) the instantaneous location of the vehicle with respect to the trip destination is displayed continuously. The navigation method provides that upon attaining the trip destination, the deviations of the input destination from the location, ascertained via the composite navigation, are processed for the calculation of correction values. The correction values are stored in memory, and they serve to update code numbers for distance and direction of the composite navigation system, for subsequent trips.

8 Claims, 2 Drawing Sheets

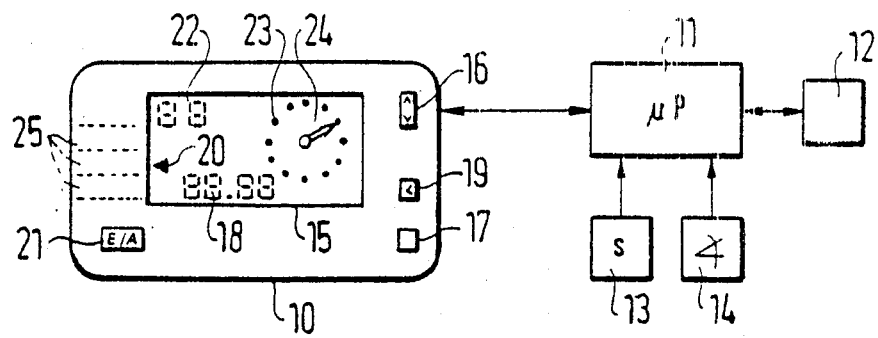
FIG. 1
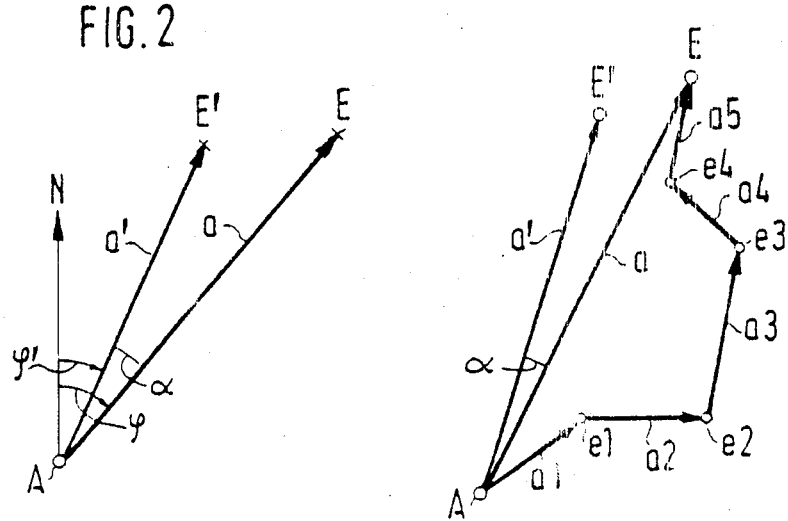
FIG. 2
FIG. 3

NAVIGATION METHOD FOR VEHICLES

PRIOR ART

The invention is based on a navigation method for vehicles, having a display arrangement, as generically defined by the preamble to the main claim.

In a known navigation system according to published German patent application DE-OS No. 33 19 207, before the trip begins the data for various destinations are input into a memory via an input device, and then the next destination to be headed for is called up. Via a composite navigation, the instantaneous location of the vehicle is ascertained continuously during the trip, and from this location the particular distance and direction toward the destination called up are displayed. On reaching the destination, all the errors in navigation that have occurred during the trip can be eliminated by pressing a correction key, so that for the subsequently called-up destination, composite navigation can again be done on the basis of correct initial coordinates.

With this system it is disadvantageous that the system errors caused by the composite navigation system occur again and again, to the same extent, in subsequent trips. An inaccuracy caused by the composite system, once present, can thus be ascertained, but not eliminated. This also applies for errors occurring because of changes in the tire size, in the tread, tire pressure, load and declination, and as a result of magnetic interference fields that vary over time.

With the present invention, the goal is to increase the accuracy of the composite navigation system with the number of trips to a destination.

ADVANTAGES OF THE INVENTION

The method according to the invention having the characteristics of the main claim has the advantage that at the end of each trip to a destination, the deviations ascertained between the input destination and the destination ascertained by the navigation system are used to recalibrate angle code numbers and travel distance code numbers of the navigation system, in order to optimize the accuracy of the composite navigation. This is particularly advantageous in navigation systems in which the operating parameters, such as the declination angle or the size and orientation of the internal magnetic field of the vehicle, lead to errors in navigation as they vary over the long term.

By means of the measures disclosed in the dependent claims, advantageous further developments of and improvements to the characteristics disclosed in the main claim are possible. A particularly simple and advantageous solution is that for calculating a correction value, the direct distance of the input destination is set as a ratio to the direct distance from the starting point ascertained by the composite navigation system, and that for calculating an angle correction, the angular deviation between the direction of the destination input into the memory and the direction of the starting point, ascertained by the composite navigation system, is set in proportion to the distance of the destination.

DRAWING

An exemplary embodiment of the invention is shown in the drawing and described in further detail in the ensuing description. Shown are:

FIG. 1, a navigation system for a motor vehicle in a block circuit diagram;

FIG. 2, the schematic representation of deviations between a trip to a destination that is input and a trip to a destination that is ascertained by the navigation system;

FIG. 3, a trip to a destination of this kind, comprising a plurality of stages, shown schematically; and FIG. 4 shows a flow chart of the navigation method with the recalibration upon reaching the destination.

DESCRIPTION OF THE EXEMPLARY EMBODIMENT

Figure 4:
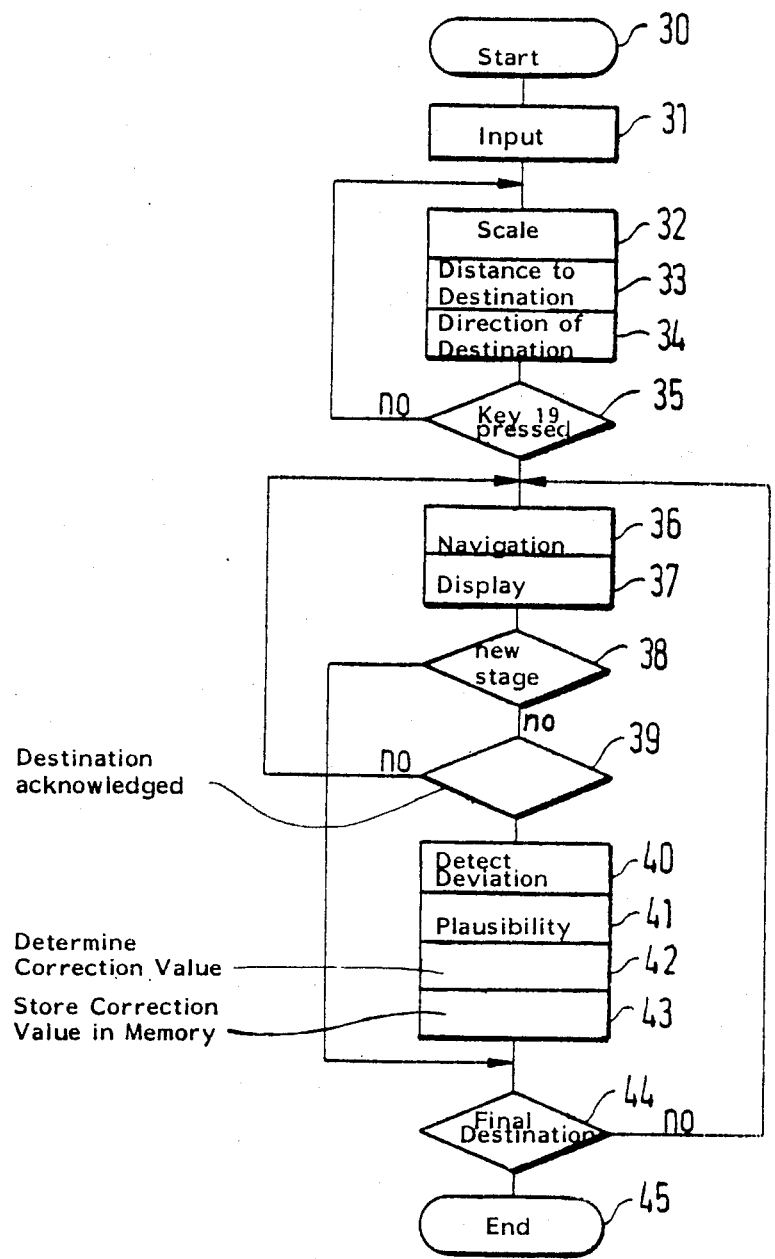

In FIG. 1, a composite navigation system for motor vehicles is shown, with which the driver, by indicating the direction of the destination and the line of sight distance, can find the desired destination in strange surroundings (known as a destination finding system). It comprises an input and output unit 10, a microprocessor 11 having a data memory 12, and a travel transducer 13 and trip direction transducer 14. The microprocessor 11 is conventionally contained along with the data memory 12 in the input and output unit 10. As the travel transducer 13, pulse transducers of a tachometer or corresponding transducers on the vehicle wheels can be used, which may possibly already be present in the vehicle, for example for a trip data computer or for an anti-lock system. As the trip direction transducer, a magnetometer or an electronic compass or a rotational angle sensor on the steering wheel or two rotational angle sensors on the non-driven axle or an intertial navigation system can be used. The microprocessor 11 with peripherals and data memory 12 forms the nucleus of the navigation system. The travel transducer 13 and the trip direction transducer 14 are connected to the microprocessor 11. Its task is to trigger the magnetometer, to process its signals and to determine an angular value which indicates the deviation of the direction of the vehicle's longitudinal axis with respect to magnetic north. Furthermore, from the pulse signals of the travel transducer 13, the microprocessor is intended to calculate the length of the route that has been covered by the vehicle. With the aid of these computed results, if a starting position has been input previously, the coordinates of the actual vehicle position can be calculated and the direction and line of sight distance with respect to the input destination can be determined. The microprocessor 11 is also intended to monitor the status of the operating keys in the input and output unit 10; it executes the control and input commands triggered by the operating keys, and also controls the output of data and directional arrows on a liquid crystal display 15 of the unit 10.

The navigation system is operated with five control keys. With a toggle key 16, numerical values can be varied on the LCD 15 in the direction of higher and lower values. A progressive, clocked time control makes it possible to approach the desired numerical value rapidly. With the actuation of an acknowledgement key 17, the actual numerical value displayed on the LCD 15 at a given time is stored in memory, this value appearing in the lower portion of the LCD 15, for example on a four-digit seven-segment display 18. The switchover of the navigation system within a menu presented is effected with a function selection key 19, in accordance with a legend 25 on the left edge area of the unit 10, and the data displayed on the LCD 15 at a given time are made recognizable at the level of the legend 25 by an arrow 20 of the LCD 15. A further key switch 21 serves to switch the composite navigation system on and off. A two digit seven-segment display 22 in the upper area of the LCD serves to identify 99 different specified destinations. A compass rose 23 of the LCD 15 with 16 different invisible arrow segments serves the purpose of direction information, and the directional arrow 24 that is triggered represents either north or the direction of the destination to be headed for.

The navigation system is conceived such that it can be built into any motor vehicle. For calibrating the navigation system, it is necessary to ascertain a travel code number and an angle code number and store them in the data memory 12, on the basis of a trip to a destination having a known route length and direction with respect to geographic north, which can be learned from a suitable map. If the travel and angular code numbers are already known, then these values can also be programmed directly, that is, without making a trip to the destination. By this means it is possible, for instance, to take the change from summer to winter tires and vice versa into account in a simple manner. To this end, additional switches can be provided on the unit 10. This also applies to a switchover from a metric measuring system to an imperial measuring system.

If a navigation trip is now to be taken using the navigation system, then the destination to be headed for first has to be input in terms of direction and distance into the input and output unit 10 and stored in memory. To this end, first the navigation system is switched on, via the key 21, and with the function selection key 19 the arrow 20 is put at the position "input", by indexing the arrow further upon each actuation of the key 19 between the functions "navigation", "input" and "compass". In FIG. 2, the direct distance between the starting point A and the final destination E of the destination trip is shown as stage a. For input of this stage into the navigation system, the indentification number of this stage is first determined, using the toggle key 16, on the upper display 22 of the LCD 15. Upon actuation of the toggle key 16, the number of stages is counted continuously upward or downward via a counter. As soon as the desired stage number appears on the two-digit seven-segment display 22, this number is associated in the data memory 12, by actuation of the acknowledgement key 17, with the stage input that now follows.

The stage to be input can be input from any arbitrary road map. To this end, first the scale of the road map must be input into the navigation system. This is done by setting the scale by acuating the toggle key 16 in the lower area of the LCD by means of the four-digit seven-segment display 18. As soon as this has been done, then by reactuating the acknowlegement key 17, this scale is stored in the data memory 12. With a scale on the map, the direct distance of the destination E from the starting point A can now be read out, and by reactuating the toggle key 16, this distance can be input on the four-digit seven-segment display 18. With the actuation of the acknowledgement key 17, the input value is then stored in the data memory 12. Now, the angle $\phi$ of the stage a relative to north has to be read out of the existing road map, using a protractor. This value is now set on the four-digit seven-segment display 18, again by actuation of the toggle key 16, and then fed into the data memory 12 by actuating the acknowledgement key 17. At the same time, the code number of the stage is indexed by 1 on the two-digit display 22. However, if no further stages are input, then by actuation of the function selection key 19, a switchover is first made to the compass system, and the arrow 20 jumps one step downward and the directional arrow 24 in the compass rose 23 now indicates north.

By actuating the function selection key 19 again, the navigation system is now switched over to the destination navigation of the input stage a with the final destination E. The directional arrow 24 on the compass rose 23 now indicates the direction in which the input destination E lies. Furthermore, on the four-digit seven-segment display 18, the direct distance between the starting point A and the destination E is displayed. As soon as the vehicle is set in motion, signals are emitted by the travel transducer 13 and by the trip direction transducer 14, with which the instantaneous location of the vehicle is ascertained continuously in the microprocessor 11, and the particular distance and direction relative to the input destination E are calculated. These data are displayed continuously on the LCD 15. The program of the microprocessor 11 is designed such that when the vehicle has approached the destination E to within 3% of the actual distance covered, the destination navigation display is switched over, and now all the directional arrows 24 of the compass rose 23 blink. The driver is now so close to his destination that because of a limited destinational accuracy of the system he can now approach his destination himself, without navigational aid.

As FIG. 2 shows, the location, ascertained by the composite navigational system with the travel transducer 13 and the trip direction transducer 14 based on the route covered by the vehicle can deviate at the final destination E' from the input final destination E by the distance a' and/or direction $\phi'$. These deviations are now detected upon attainment of the final destination E' by actuating the acknowledgement key 17, in order to calculate correction values. The correction values calculated from this are stored in memory, and the subsequent data ascertained by the composite navigational system relating to the particular location of the vehicle can be corrected with these correction values. The value $F1=K1 \times a/a'$ can be ascertained as the correction value for the travel code number and the value $F2=K2 \times \alpha$ can be ascertained as the correction value for the directional code number, and for calculating the correction value F1, the direct distance a of the input destination E is set in proportion to the direct distance a' from the starting point A as ascertained by the composite navigational system. The correction value F2 is the result of the angular deviation $\alpha=\phi-\phi'$ between the direction of the destination E input in the data memory 12 and the direction $\phi'$, ascertained by the composite navigational system, from the starting point A. With the factors $K1<1$ and $K2<1$, the deviations and the corrections ascertained from them can be weighted. In this connection, it is provided in the program of the microprocessor 11 that the ascertained deviations first be weighted with a K1 or K2 of 20%. However, if several deviations tending in the same direction occur in succession, then the factor K1 or K2 is increased after each trip to a destination by 10%. It can also be provided that the factor K2 for the angular correction be increased with increasing travel distance, for example by 10% for each 10 km of travel distance.

As FIG. 3 shows, the travel route located between the starting point A and a final destination E can also be broken down into a plurality of stages with directions deviating from one another. The individual stages can also be taken from a plurality of maps having different scales. In this case, before the trip begins the individual destinations of the stages e1-e4 and E must be input in succession, via the input and output unit 10, into the data memory 12 of the navigational system. The flow chart of FIG. 4 is intended to explain that selectively upon reaching each destination stage, by actuating the acknowledgement key 17, the deviations of the input destination stage e1-e4 from the ascertained destination stage are detected and processed, or that the deviations are detected and processed only upon attaining the final destination E, by actuation of the acknowledgement key 17, in order to calculate the correction values.

When the on and off switch 21 is actuated, in step 30 of the flow chart the navigation system is switched on, and by actuation of the function selection key 19 in step 31, the input of the stages a1-a5 is prepared for. After suitable input of the scale of the road map used, in step 32, the first stage a1 is now inputted, in that in step 33 the distance of the destination stage e1 is inputted, and in step 34 its destination direction is input relative to north. In step 35, there is a waiting period to see whether further stages are to be recorded. For the input of the following stages a2-a5, consequently, the program loop that includes the steps 32-35 will be run through repeatedly. Finally, if the final destination E has been input at the stage a5, then by actuating the function selection key 19 twice in step 36, the destination navigation is activated, and in step 37 the direction and distance of the first destination stage e1 are displayed on the LCD 15. In program step 38 it is now checked whether another destination stage was called up by actuation of the toggle key 16. As long as that is not the case, the navigation and the display are continued via a program loop including the steps 36-39. Once the first destination stage e1 has been reached, then this is acknowledged by an actuation of the acknowledgement key 17, because otherwise as the trip continues the navigational display would continue to show the distance and direction of the destination stage e1 that has been approached. Then in step 40, first the directional and distance deviations between the input destination stage e1 and the location of the vehicle ascertained by the navigation system are detected. By means of a plausibility control, it is now checked in step 41 whether the ascertained deviations are within the range of the possible, or for instance because of incorrect input or other conditions (worst case constellations) should not be taken into consideration. In step 42, finally, the corresponding correction values F1 and F2 are ascertained and in step 43 these values are stored in memory in the data memory 12 and used for the correction of all subsequent travel and directional data ascertained by the composite navigational system. In step 44 it is checked whether further destination stages have been input. Since this is true for FIG. 3, the next destination stage e2 is now emitted via the LCD display 15, via a program loop, and the program steps 36-44 are now run through once again. The same process is then repeated for the stages a3-a5. At the end of the last stage a5, in program step 44, it is recognized that the final destination E has now been reached. In step 45, consequently, the navigation program is ended and the microprocessor 11 automatically switches to the compass display. If the user is to be given an opportunity to decide whether a correction should be performed only upon reaching the final destination, then that could be controlled via the duration of pressure on the acknowledgement key 17 upon reaching the destination stages e1-e4. If the key 17 is actuated only briefly, that could be the sign that no correction is desired there.

Within the scope of the present invention, it is also possible to use input and output units with which, prior to the beginning of a trip, the desired travel route is traced on a road map using a marking wand, the movements of the wand being electrically detected and stored in memory. The travel route input in this manner is reproduced on a display, on which the instantaneous location of the vehicle is also displayed (published German patent application DE-OS No. 33 41 679). Here again, after a navigational trip, a correction of the navigation system for subsequent trips should be performed, by detecting the deviations between the input values and the values ascertained by the composite navigation system.

With the method according to the invention, the errors originating in the composite navigation are not only eliminated but are used for calculation of correction parameters. With the aid of these correction parameters, the code numbers for the system, for the travel and for the direction of the navigation system are updated continuously, so that with increasing use of the navigation system, the errors are finally incrementally minimized. By means of plausibility controls, it can finally be prevented that erroneous inputs or erroneously input scales will bring about a false correction of the navigational system.

We claim:

1. Navigation method for vehicles equipped with a composite navigation system which includes a display device for representing a plurality of trip destinations in terms of direction and distance, an input device and a memory, the method comprising the steps of:
    placing destination data into the memory via the input device before the trip is started;
    continuously determining the instantaneous location of the vehicle during the trip by means of the composite navigation system and displaying said instantaneous location relative to a selected trip destination;
    detecting the deviation (angle and distance) of each instantaneous location determined by the composite navigation system from said selected trip destination upon reaching the actual trip destination;
    weighting the detected deviation with factors ($K1 < 1$; $K2 < 1$), respectively, to form a weighted deviation;
    computing correction values (F1, F2) with the composite navigation system utilizing the weighted deviation;
    storing the computed correction values (F1, F2);
    correcting subsequent data detected by the composite navigation system indicative of the actual position of the vehicle with said correction values (F1, F2); and,
    increasing at least on of the weighting factors (K1, K2) by a predetermined percentage of the associated detected deviation after each further trip to a new selected trip destination when a new deviation occurs.

2. The navigation method of claim 1, wherein the weighting factors (K1, K2) are selected as 20% of said detected deviation (angle and distance) when said new deviation first occurs, and with new deviations occurring one after the other, and each of the weighting factors is increased by 10% of each said new detected deviation.

3. The navigation method of claim 1, wherein: the trip has a travel route located between the starting point (A) and the final destination (E) and said travel route is broken down in to a plurality of stages (a1 to a5) with directions deviating from one another which are entered into the memory in the form of stage destinations (e1 to e4, E) before the trip is begun.

4. The navigation method of claim 3, wherein said plurality of stage destinations (e1 to e4, E) are determined sequentially and, upon attaining each said stage destination, the deviations of the entered stage destination from the determined stage destinations are detected and processed by actuating an acknowledgement key.

5. The navigation method of claim 3, wherein, upon reaching the final destination (E), the weighted deviation for computing the correction values is detected and processed by actuation of an acknowledgement key.

6. The navigation method of claim 3, wherein the distance between said starting point (A) and said final destination (E) is the direct distance (a); and, the correction value (F1) is computed by forming a ration of said direct distance (a) to a direct distance (a') measured from the starting point (A) and ascertained by the composite navigation system.

7. The navigation method of claim 6, wherein the direction of the final destination (E) from the starting point (A) entered into the memory and the direction of a destination (E,) from the starting point (A) determined by the composite navigation system conjointly define an angular deviation ($\alpha$) which is ascertained for determining said corrective value (F2).

8. The navigation method of claim 1, wherein the detected deviations are subjected to a plausibility check to avoid unwanted corrections of the navigation system.

* * * * *